United States Patent
Cao et al.

(10) Patent No.: US 11,611,417 B2
(45) Date of Patent: Mar. 21, 2023

(54) PHYSICAL LAYER PARSING FOR MULTIPLE INPUT MULTIPLE OUTPUT (MIMO) PUNCTURED TRANSMISSION AND APPARATUS

(71) Applicant: NXP USA, Inc., Austin, TX (US)

(72) Inventors: Rui Cao, Sunnyvale, CA (US);
Hongyuan Zhang, Fremont, CA (US);
Sudhir Srinivasa, Los Gatos, CA (US)

(73) Assignee: NXP USA, INC., Austin, TX (US)

( * ) Notice: Subject to any disclaimer, the term of this patent is extended or adjusted under 35 U.S.C. 154(b) by 213 days.

(21) Appl. No.: 17/102,656

(22) Filed: Nov. 24, 2020

(65) Prior Publication Data

US 2021/0160959 A1 May 27, 2021

Related U.S. Application Data

(60) Provisional application No. 62/940,758, filed on Nov. 26, 2019.

(51) Int. Cl.
| | |
|---|---|
| *H04L 5/00* | (2006.01) |
| *H04W 72/04* | (2009.01) |
| *H04W 72/0453* | (2023.01) |
| *H04W 80/02* | (2009.01) |
| *H04B 7/0413* | (2017.01) |

(52) U.S. Cl.
CPC ............ *H04L 5/0046* (2013.01); *H04L 5/001* (2013.01); *H04L 5/0075* (2013.01); *H04W 72/0453* (2013.01); *H04B 7/0413* (2013.01); *H04L 5/0062* (2013.01); *H04L 5/0073* (2013.01); *H04W 80/02* (2013.01)

(58) Field of Classification Search
CPC ..... H04L 5/001; H04L 5/0046; H04L 5/0062; H04L 5/0073; H04L 5/0075; H04W 72/0453
See application file for complete search history.

(56) References Cited

U.S. PATENT DOCUMENTS

| | | | |
|---|---|---|---|
| 2012/0087436 A1* | 4/2012 | Srinivasa | H04L 1/0059 375/295 |
| 2012/0314802 A1* | 12/2012 | Oh | H04L 1/06 375/295 |
| 2019/0281614 A1* | 9/2019 | Chen | H04L 5/0007 |
| 2020/0329519 A1 | 10/2020 | Cao et al. | |

* cited by examiner

*Primary Examiner* — Kevin C. Harper

(57) ABSTRACT

A data unit comprising bits to transmit over one or more frequency segments in a frequency range is obtained. An effective bandwidth in each frequency segment of the frequency range is determined, where the effective bandwidth excludes bandwidth of one or more punctured subchannels in a respective frequency segment. Bits are encoded based on the effective bandwidth of each frequency segment followed by parsing the encoded bits to one or more streams and parsing the encoded bits of a stream to the one or more frequency segments. The parsing of the encoded bits of the stream comprises allocating a first number of consecutive encoded bits to a first frequency segment and allocating a second number of consecutive encoded bits to a second frequency segment, wherein the first number and the second number are based on the effective bandwidth of the first frequency segment and the second frequency segment. The encoded bits are modulated and mapped to subcarriers for transmission.

20 Claims, 9 Drawing Sheets

PHYSICAL LAYER PARSING FOR MULTIPLE INPUT MULTIPLE OUTPUT (MIMO) PUNCTURED TRANSMISSION AND APPARATUS

RELATED APPLICATION

This application claims a benefit of priority to U.S. Provisional Application No. 62/940,758, entitled "Extra High Throughput (EHT) Punctured SU/MIMO PHY Parsing," filed Nov. 26, 2019, the contents of which are incorporated herein by reference in its entirety.

FIELD OF USE

This disclosure generally relates to wireless communication, and more particularly to physical layer parsing for multiple input multiple output (MIMO) punctured transmission associated with wireless communication.

BACKGROUND

A wireless or WiFi system operating in accordance with the Institute of Electrical and Electronics Engineers (IEEE) standard such as 802.11ax or 801.11be (Extremely High Throughput (EHT)) which is currently in development define a protocol for wirelessly transmitting data to one or more users. The data is transmitted over one or more 20 MHz subchannels of an 80 MHz frequency segment where two (802.11ax) or four (801.11be) 80 MHz frequency segment defines a frequency spectrum associated with the WiFi transmission. In some situations, incumbents such as non-WiFi licensed devices or WiFi devices in overlapped basic service sets (OBSS) deployments interfere with transmission over the one or more subchannels. The interference, commonly referred to as puncturing of the subchannel, renders the subchannel unavailable to transmit data.

Figure 1:
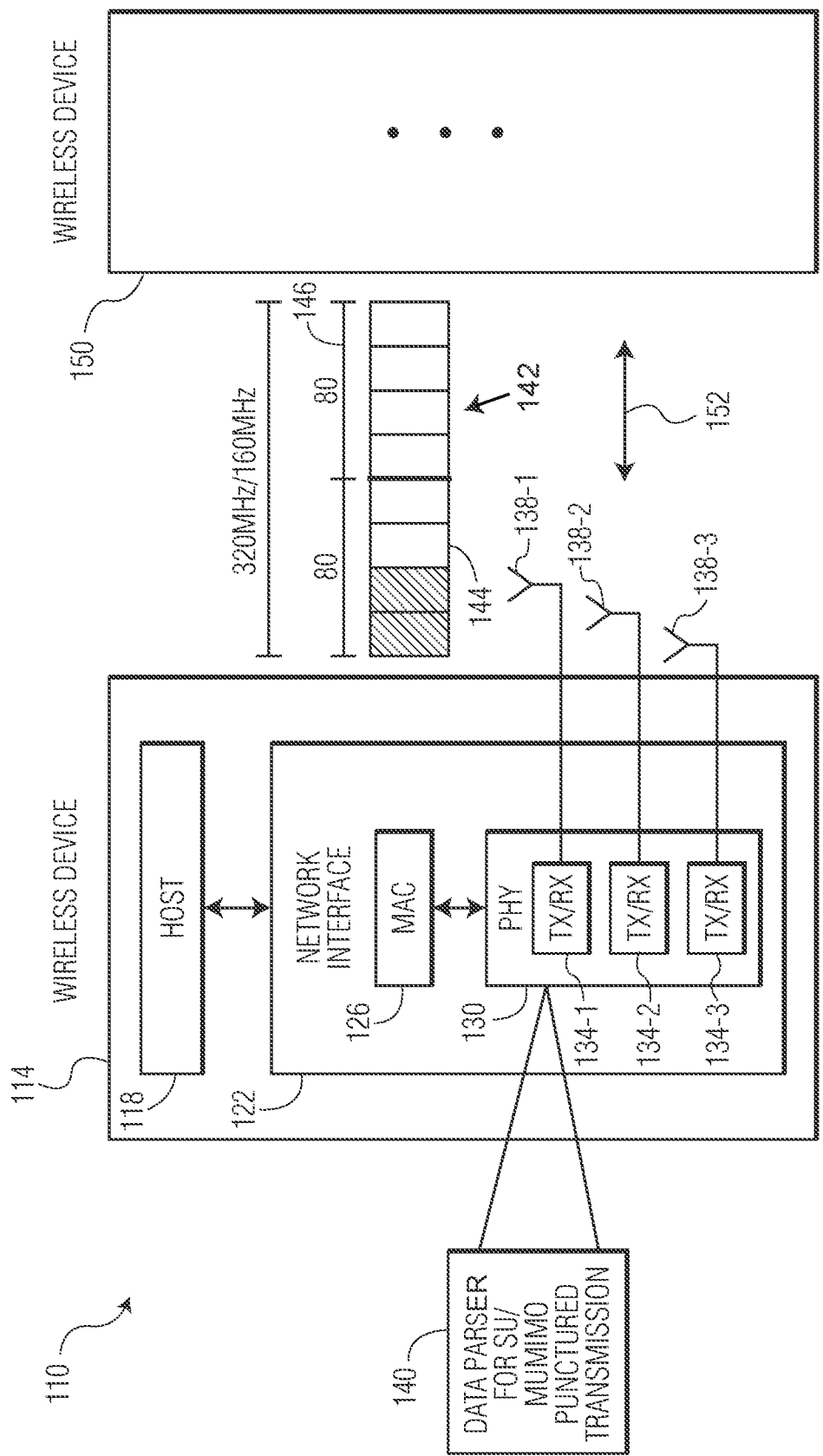
FIG. 1 is a block diagram of an example multiple input multiple output (MIMO) wireless system arranged for transmitting data over a frequency range with one or more punctured subchannels, in accordance with exemplary embodiments of the invention.

The drawings are for the purpose of illustrating example embodiments, but it is understood that the embodiments are not limited to the arrangements and instrumentality shown in the drawings.

DETAILED DESCRIPTION

The description that follows includes example systems, methods, techniques, and program flows associated with physical layer parsing for multiple input multiple output (MIMO) punctured transmission. A MIMO transmission involves one wireless device transmitting a data unit such as a physical protocol data unit (PPDU) which spans a frequency range comprising one or more frequency segments over one or more spatial streams to one or more other wireless devices. In examples, some subchannels of the frequency segments of the frequency range are punctured. For example, in the event that a frequency range has a bandwidth of 160 MHz defined by two 80 MHz frequency segments and one 20 MHz subchannel in a 80 MHz frequency segment is punctured, the data unit is transmitted over 60 MHz of one 80 MHz frequency segment and the other 80 MHz segment. A physical layer parsing involves a physical layer processor of the wireless device receiving a physical service data unit (PSDU) from a media access protocol (MAC) processor and allocating bits associated with the PSDU to each of the frequency segments. An effective bandwidth of a frequency segment is a bandwidth of the frequency segment, which does not include bandwidth of subchannels which are punctured. In one example, the physical layer processor performs a proportional round robin scheme to proportionally allocate (in a round) bits associated with the PSDU based on the effective bandwidth of each frequency segment of the frequency spectrum. In another example, the physical layer processor divides the frequency range into one or more resource units (RUs) comprising one or more frequency segments. Each RU is a contiguous bandwidth that does not span any punctured subchannel and each RU is assigned to a same user. A MAC processor generates multiple PSDUs for the user based on bits to be transmitted to the user. The physical layer processor obtains each PSDU from the MAC processor and performs a physical layer parsing of bits associated with each PSDU over a respective RU. Based on the physical layer parsing, the wireless device transmits a data unit such as a physical protocol data unit (PPDU) as a MIMO punctured transmission over the frequency range in one or more spatial streams to the wireless device increasing per-device throughput compared to orthogonal frequency division multiple access (OFDMA) transmission. Well known instructions, protocols, structures, and techniques have not been shown in detail in order not to obfuscate the description.

Example System

FIG. 1 is a block diagram of an example multiple input multiple output (MIMO) wireless system 110 arranged for transmitting data units over a frequency range with one or more punctured frequency segments. The wireless system 110 includes a wireless device 114 which exchanges the data units with another wireless device 150 over an air interface 152. The wireless device 114 (and similarly wireless device 150) may have a host processor 118 coupled to a network interface device 122. The network interface device 122 includes one or more medium access control (MAC) processors 126 (sometimes referred to herein as "the MAC processor 126" or "MAC 126" for brevity) and one or more physical layer (PHY) processors 130 (sometimes referred to herein as "the PHY processor 130" or "PHY 130" for brevity). The PHY processor 130 includes a plurality of transceivers 134, and the transceivers 134 are coupled to a plurality of spatial separated antennas 138 which each transmit a spatial stream. Although three transceivers 134 and three antennas 138 are illustrated in FIG. 1, the wireless device 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized. Further, the wireless device 150 may be arranged in a manner similar to wireless device 114 or have a different number of MAC processors, PHY processors, transceivers and/or antennas.

The network interface device 122 is implemented using one or more integrated circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface device 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network interface device 122 may be implemented, at least partially, on a second IC. As another example, the host processor 118 and at least a portion of the network interface device 122 may be implemented on a single IC.

In various embodiments, the MAC processor 126 and/or the PHY processor 130 of the AP 114 are configured to generate data units, and process received data units, that conform to a WiFi communication protocol such as a communication protocol conforming to the IEEE 802.11 Standard such as 802.11be or another suitable wireless communication protocol. For example, the MAC processor 126 may be configured to implement MAC layer functions based on the open systems interconnection (OSI) model, including MAC layer functions of the WiFi communication protocol, and the PHY processor 130 may be configured to implement PHY layer functions based on the OSI model, including PHY layer functions of the WiFi communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 sometimes referred to as physical service data units (PSDUs) in a physical layer and perform physical layer functions such as encapsulating the PSDUs to generate PHY data units such as PHY protocol data units (PPDUs) for transmission via the antennas 138. Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units. PHY data units are sometimes referred to herein as "packets", and MAC layer data units are sometimes referred to herein as "frames".

In connection with generating one or more radio frequency (RF) signals for transmission, the PHY processor 130 is configured to process (which may include modulating, filtering, etc.) data corresponding to a PPDU to generate one or more digital baseband signals, and convert the digital baseband signal(s) to one or more analog baseband signals, according to an embodiment. Additionally, the PHY processor 130 is configured to upconvert the one or more analog baseband signals to one or more RF signals for transmission via the one or more antennas 138.

In connection with receiving one or more RF signals, the PHY processor 130 is configured to downconvert the one or more RF signals to one or more analog baseband signals, and to convert the one or more analog baseband signals to one or more digital baseband signals. The PHY processor 130 is further configured to process (which may include demodulating, filtering, etc.) the one or more digital baseband signals to generate a PPDU. The PHY processor 130 includes amplifiers (e.g., a low noise amplifier (LNA), a power amplifier, etc.), an RF downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc., that are not shown in FIG. 1 for purposes of brevity.

The MAC processor 126 is configured to control the PHY processor 130 to generate one or more RF signals, for example, by providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In another embodiment, the MAC processor 126 includes a hardware state machine.

The wireless device 114 may operate in accordance with multiple input multiple output (MIMO) where one or more signals is sent and received over the air interface 152 by exploiting multipath propagation. In one example, a data unit such as a PPDU is transmitted to a single user (SU) using one or more spatial streams which span an entire frequency range. In another example, a data unit such as PPDU is transmitted to each user of multiple users (MU) using one or more spatial streams which span an entire frequency range. In examples, the SU may be a single wireless device and the MU may be multiple wireless devices.

The frequency range 142 over which the data unit is transmitted as one or more spatial streams may span 160 MHz (as shown) or 320 MHz (not shown) in accordance with 802.11be. The frequency range 142 may comprise one or more frequency segments, an example of which is shown as frequency segment 146 comprising one or more subchannels 144. Each of the frequency segments 146 may each have an effective bandwidth as defined below for transmitting data, and each frequency segment 146 may have a same effective bandwidth or a different effective bandwidth.

Incumbents such as non-WiFi licensed devices or WiFi devices associated with overlapped basic service sets (OBSS) deployments transmit wireless signals which interfere with a bandwidth of one or more subchannels 144 of the one or more frequency segments 146 resulting in the subchannel being punctured. The puncturing of a subchannel means that one or more subcarriers in the subchannel may not be available for transmitting data. For instance, if the subchannels 144 are each 20 MHz subchannels and the frequency range 142 is 160 MHz, the incumbents may generate interference in subchannels 144 of two frequency segments 146 resulting in two 20 MHz subchannels 144 of the 80 MHz frequency segment 146 being punctured and not available for transmitting data. The puncturing is illustrated by the shading of subchannels 144. An effective bandwidth of a frequency segment 146 is a bandwidth of the frequency segment 146, not including bandwidth of subchannels which are punctured. In this example, the effective bandwidth of the 80 MHz frequency segment 146 would be 40 MHz.

Various embodiments of the wireless device 114 incudes a data parsing system 140 for punctured MIMO transmission of data units over the frequency range 142. The data parsing system 140 may be implemented in software, circuitry such as analog circuitry, mix·signal circuitry, memory circuitry, logic circuitry, processing circuitry, or combinations thereof. In examples, the data parsing system 140 parses bits associated with a data unit such as a PSDU for transmission over the frequency range 142 with one or more punctured frequency segments to a wireless device. The parsing involves receiving a PSDU from the MAC processor 126, encoding, stream parsing, and segment parsing which involves the PHY processor 130 allocating bits associated with the PSDU to each frequency segment of the frequency spectrum. In some examples, a round robin scheme is performed to proportionally allocate (in a round) bits associated with the PSDU based on the effective bandwidth of each frequency segment of the frequency spectrum. In another example, the physical layer processor divides the frequency range into one or more resource units (RUs) comprising one or more frequency segments. Each RU has a contiguous bandwidth that does not span any punctured subchannel and each RU is assigned to a same user. A MAC processor 126 generates multiple PSDUs for the user based on bits to be transmitted to the user. The physical layer processor 130 obtains each PSDU from the MAC processor and performs a physical layer parsing of bits associated with each PSDU over a respective RU which does not have any punctured subchannels. Based on the physical layer parsing, the physical layer transmits a data unit such as a PPDU as a MIMO punctured transmission as one or more spatial streams increasing per-device throughput compared to orthogonal frequency division multiple access (OFDMA) transmission.

In examples, functionality of the data parser 140 of the PHY processor 130 may be characterized as joint or semi-joint parsing. Functionality of the data parsing may be characterized as joint parsing where the data parser 140 encodes bits of a PSDU based on a sum of the effective bandwidth of the one or more frequency segments 144 in the frequency spectrum 142 followed by parsing the encoded bits to one or more spatial streams and one or more frequency segments as described below to transmit a PPDU associated with the PSDU. Functionality of the data parsing may be characterized as semi-joint parsing where the data parser 140 parses bits of the PSDU to frequency segments as described below followed by encoding bits of a frequency segment based on an effective bandwidth of the frequency segment associated with the encoded bits to transmit a PPDU associated with the PSDU in one or more spatial streams. The functionality of the data parser 140 may be characterized in other ways as well such as RU based data parsing when a multiple RUs are assigned to a user and PSDUs associated with the user are transmitted in respective RUs.

Figure 2:
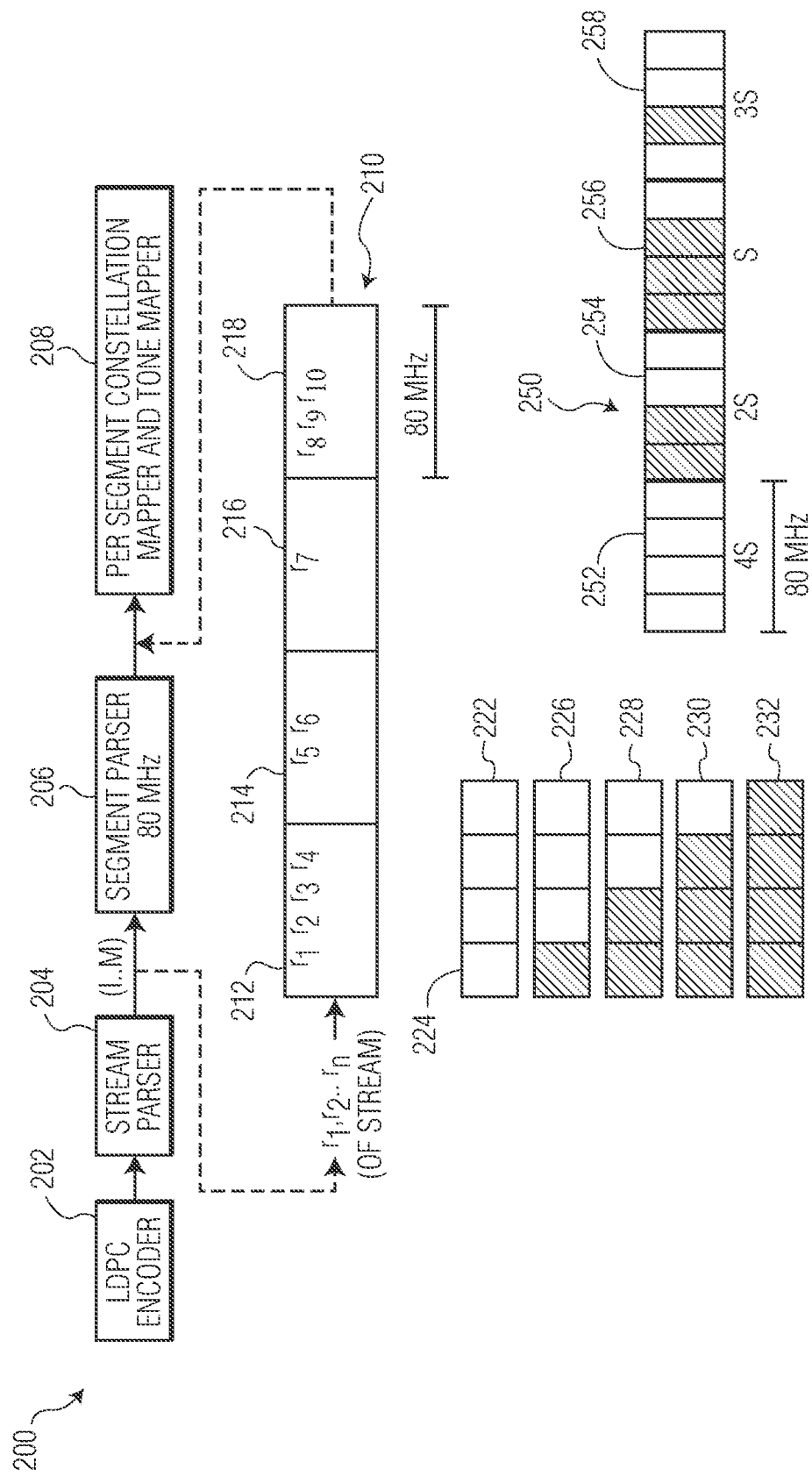
FIG. 2 illustrates an example fully joint data parser of a physical layer (PHY) processor which is arranged to perform data parsing for transmitting data over a frequency range with one or more punctured subchannels, in accordance with exemplary embodiments of the invention.

FIG. 2 illustrates an example data parser 140 of the PHY processor 130 shown as joint data parser 200 which is arranged to perform the data parsing for transmitting data units over a frequency range with one or more punctured frequency segments. The data parser 200 includes an encoder 202, a stream parser 204, a segment parser 206, and a constellation mapper and tone mapper 208. The encoder 202, stream parser 204, segment parser 206, and constellation mapper and tone mapper 208 may be implemented in software, circuitry such as analog circuitry, mix signal circuitry, memory circuitry, logic circuitry, processing circuitry, or combinations thereof. The encoder 202 later followed by the segment parser 206 is characteristic of the joint data parser 200.

The encoder 202 performs an encoding of bits of a data unit from the MAC processor 126 to form an encoded bitstream. The encoding adds redundancy to the bits of the data unit to improve chances of recovery when the bits of the data unit are subsequently transmitted by the antenna 138. The data unit may take the form of a PSDU. In examples, the MAC processor 126 may define a size of the PSDU (i.e., number of bits) based one or more of the effective bandwidths of the frequency segments, a number of spatial streams, and the MCS. In some examples, the encoder 202 may be a low density parity check coder (LDPC) encoder which encodes the bits of the data unit with a linear error correcting code. The encoder 202 encodes the bits with a code rate which depends on a sum of the effective bandwidth of the one or more frequency segments in the frequency spectrum. As described below with respect to the constellation mapper and tone mapper 208, the bits of the data unit may be transmitted as orthogonal frequency division multiplexing (OFDM) symbols. In some examples, the encoder 202 may encode the bits further based on a number of data bits per orthogonal frequency division multiplexing (OFDM) symbol ($N_{DBPS}$) and a number of coded bits per OFDM symbol ($N_{CBPS}$) transmitted by the wireless device 114 which may also depend on the sum of the effective bandwidth of the one or more frequency segments in the frequency spectrum such as 20 MHz, 40 MHz, 60 MHz, 80 MHz, 100 MHz, 120 MHz, 140 MHz, 160 MHz for a 160 MHz frequency range 142 and a modulation scheme associated with the symbol. The wireless device 114 may store one or more tables which indicate for a bandwidth and modulation scheme, the $N_{DBPS}$ and $N_{CBPS}$ which the encoder 202 uses to encode the bits of the data unit from the MAC processor 126. $N_{DBPS}$ may be used to determine a number of OFDM symbols to transmit the PSDU based on a length the PSDU and the number of OFDM symbols may be used to determine a number of payload bits $N_{pld}$. Further, the $N_{CBPS}$ and the number of OFDM symbols may be used to determine a number of available bits Navbits to encode the bits of the data unit. The $N_{pld}$ and Navbits are both inputs to the LDPC encoder to define a LDPC codeword length and number of LDPC codewords to encode the bits of the data unit using conventional LDPC encoding techniques.

The stream parser 204 then parses the encoded bitstream of the PSDU to define one or more streams, e.g., streams 1 to M where M≥1 from the encoded bitstream. Each stream may be associated with a spatial stream and bits may be allocated uniformly or non-uniformly to each of the streams. For example, first bits in the encoded bitstream may be allocated to one stream and then second bits in the encoded bitstream following the first bits in the encoded bitstream may be allocated to a second stream of two streams. In an example, a maximum number of spatial streams may correspond to a number of transmit antennas 138 of the wireless device 114.

The segment parser 206 then allocates bits of a stream output by the stream parser 204 to frequency segments of the frequency range. In 802.11be, the frequency range may be 160 MHz or 320 MHz and comprise one or more 80 MHz frequency segments. In the event that a frequency range is 320 MHz, the bits may be allocated to one or more of four frequency segments which are 80 MHz each. An effective bandwidth of a frequency segment is a bandwidth of the frequency segment, which does not include bandwidth of subchannels which are punctured. In examples, the segment parser 206 performs a round robin scheme to proportionally allocate (in a round) bits associated with a stream to each frequency segment based on the effective bandwidth of each frequency segment of the frequency range. The allocation may be represented as x·s:y·s:z·s:k·s where x·s represents bits allocated a first frequency segment, y·s represents bits allocated a second frequency segment, z·s represents bits allocated a third frequency segment, and k·s represents bits allocated a fourth frequency segment for a frequency range having four frequency segments. Each of x, y, z, and k may be ratio calculated by determining a number subchannels which are not punctured for each frequency segment (e.g., effective bandwidth) and then normalizing by a maximum common divisor. The maximum common divisor may be the maximum divisor of a count of number subchannels which are not punctured across all the frequency segments. Further, a value of s may depend on a modulation scheme of the constellation mapper. In the event that the constellation mapper 208 uses a 16 quadrature amplitude modulation (QAM) with four bits in a constellation, s=2 and in the event that the constellation mapper 408 uses a quadrature phase shift keying modulation (QPSK) with two bits in a constellation, s=1.

If each of the frequency segments has four subchannels none of which are punctured, the maximum common divisor may be four and the allocation for the four frequency segments may be (4/4)·s:(4/4)·s:(4/4)·s:(4/4)·s or s:s:s:s. Bits of a stream are allocated in a round robin process such that s bits are allocated to a first frequency segment, a next s bits of the stream are allocated to a second frequency segment, a next s bits of the stream are allocated to a third frequency segment, and a next s bits of the stream are allocated a fourth next frequency segment to complete the round, and a process repeated back at the first frequency segment one or more times or rounds until a total number of bits of the stream are allocated.

If zero or more subchannels of a frequency segment are punctured, the allocation may be different. Frequency segment 222, 226, 228, 230, and 232 show various examples of frequency segments with different number of punctured subchannels. In one example, in the event that no subchannel is punctured (illustrated by the lack of shading of a subchannel 224), four 20 MHz channels may be available to transmit in the frequency segment 222 (80 MHz effective bandwidth). In another example, in the event that one 20 MHz channel is punctured in a frequency segment 226 (illustrated by the shading), three 20 MHz channels (60 MHz effective bandwidth) may be available to transmit in the frequency segment 226. In another example, in the event that two 20 MHz channels are punctured in a frequency range 228 (illustrated by the shading), two 20 MHz channels (40 MHz effective bandwidth) in the frequency segment 228 may be available to transmit. In yet another example, in the event that three 20 MHz channels of a frequency segment 230 are punctured in a frequency range 230 (illustrated by the shading), one 20 MHz channel (20 MHz effective bandwidth) in the frequency segments 230 may be available to transmit. In another example, in the event that four 20 MHz channels 232 are punctured in a frequency segment 238 (illustrated by the shading), no 20 MHz channels (0 MHz effective bandwidth) in the frequency segment 232 may be available to transmit.

A frequency range may be arranged with one or more of the frequency segments 222, 226, 228, 230, 232. Frequency range 250 is an example of such a frequency range. Frequency range 250 has four frequency segments 252, 254, 256, 258. In this example, no subchannels of the frequency segment 252 may be punctured, two subchannels of the frequency segment 254 may be punctured, three subchannels of the frequency segment 256 may be punctured, and one subchannel of the frequency segment 258 may be punctured. The proportion of bits in a round may be allocated in this example in accordance with 4s:2s:s:3s where each ratio x, y, z, k is associated with a maximum common divisor of 1 (associated with the $3^{rd}$ frequency segment with one subchannel which is not punctured) in this example. As a result, 4s bits may be allocated to the frequency segment 252 as shown with respect to segment 222, followed by 2s bits allocated to frequency segment 254 as shown with respect to segment 228, followed by s bits allocated to frequency segment 256 as shown with respect to segment 230, and followed by 3s bits allocated to frequency segment 258 as shown with respect to segment 226 in a round, and this process repeated in a round robin fashion until bit $r_n$ is allocated. The round may be defined by allocating bits to segments 252, 254, 256, and 258 in this example.

The bit allocation by the segment parser 206 is further illustrated graphically by frequency range 210 which is arranged in a manner similar to that of frequency range 250. Frequency range 250 shows a stream of bits represented as bits $r_1$ to $r_n$ where r is a bit input into the frequency range 250 comprising a frequency segment 212 having a same number of punctured subchannels as frequency segment 252, segment 214 having a same number of punctured subchannels as frequency segment 254, segment 216 having a same number of punctured subchannels as frequency segment 256, segment 218 having a same number of punctured subchannels as frequency segment 258. With s=1, the bits r of the stream may be allocated such that four bits are allocated to frequency segment 212, followed by two next consecutive bits allocated to frequency segment 214, followed by next consecutive bit allocated to frequency segment 216, and next three consecutive bits allocated to frequency segment 218 to complete the round, and a process repeated back at segment 212 one or more times or rounds with additional bits in the same proportion 4s:2s:s:3s until a total number of bits $r_n$ of the stream are allocated. The round may be defined by allocating bits to segments 212, 214, 216, and 218 in this example. The allocation may be different depending on other puncturing associated with a frequency segment. Further, if the ratio associated with a frequency segment is not an integer value, then a different number of bits may be allocated over multiple rounds to the frequency segment so that the number of bits allocated the frequency segment on average over the multiple rounds is close to the ratio.

Data subcarriers are associated with each frequency segment. The PHY processor 130 uses the subcarriers to transmit the bits and a total number of bits allocated to a frequency segment may depend on one or more of a number of data subcarriers associated with a frequency segment, the number of spatial streams that are transmitted using the data subcarriers, and a modulation and coding scheme (MCS) used by the encoder 202 and/or constellation mapper 208 to transmit bits. In some examples, the proportional round-robin allocation for a stream based on frequency segments with punctured subchannels may result in unallocated bits. The unallocated bits may be remaining bits of a stream to be allocated when all data subcarriers in the frequency segments with punctured subchannels are arranged to transmit bits, while other frequency segments without punctured subchannels still have data subcarriers available to transmit bits.

For example, a total number of bits that can be allocated to an 80 MHz segment with a 40 MHz punctured bandwidth may be less than half of a number of bits that can be allocated to an 80 MHz segment because a number of data subcarriers to transmit bits associated with the 80 MHz frequency segment with the 40 MHz punctured bandwidth may be less than half of a number of data subcarriers associated with an 80 MHz frequency segment. For example, the number of data subcarriers ($N_{SD}$) table may indicate that a 80 MHz frequency segment may have 980 data subcarriers to transmit allocated bits while a 80 MHz frequency segment with a 40 MHz punctured bandwidth may have 468 data subcarriers to transmit allocated bits, in an example. After all data subcarriers are arranged to transmit bits in the 80 MHz frequency segment with the 40 MHz punctured bandwidth by the proportional round robin bit allocation process, any remaining bits of the stream may be allocated to frequency segments which do not have punctured subchannels in the frequency range until all the bits associated with the stream are allocated. The segment parser 206 may allocate remaining bits of the stream to frequency segments with no punctured subchannels based on the round robin segment parsing limited to frequency segments with no punctured subchannels.

The data parser 200 also comprise a per segment constellation mapper and tone mapper 208. The constellation mapper may modulate each group of bits of a frequency segment processed by the segment parser 206 to a constellation point in a constellation. The constellation which the group of bits is modulated may be, for example, a binary phase shift keying (BPSK) signal or a QAM signal. The tone mapper then maps each of the signals output by the constellation mapper to one or more data subcarriers (tones) defined for the frequency segment where each subcarrier may be orthogonal to each other. In addition to the frequency segment having 20 MHz of effective bandwidth, 40 MHz of effective bandwidth, or 80 MHz of effective bandwidth, the tone mapper may be further arranged to map the signals to subcarriers to a frequency segment with 60 MHz of effective bandwidth. The subcarriers may be input into an inverse fast Fourier transform (IFFT) and which outputs one or more OFDM symbols. The per segment constellation mapping and tone mapper 208 may be performed for each frequency segment associated with each stream to transmit the PPDU as one or more streams over the one or more antennas 138.

Figure 3:
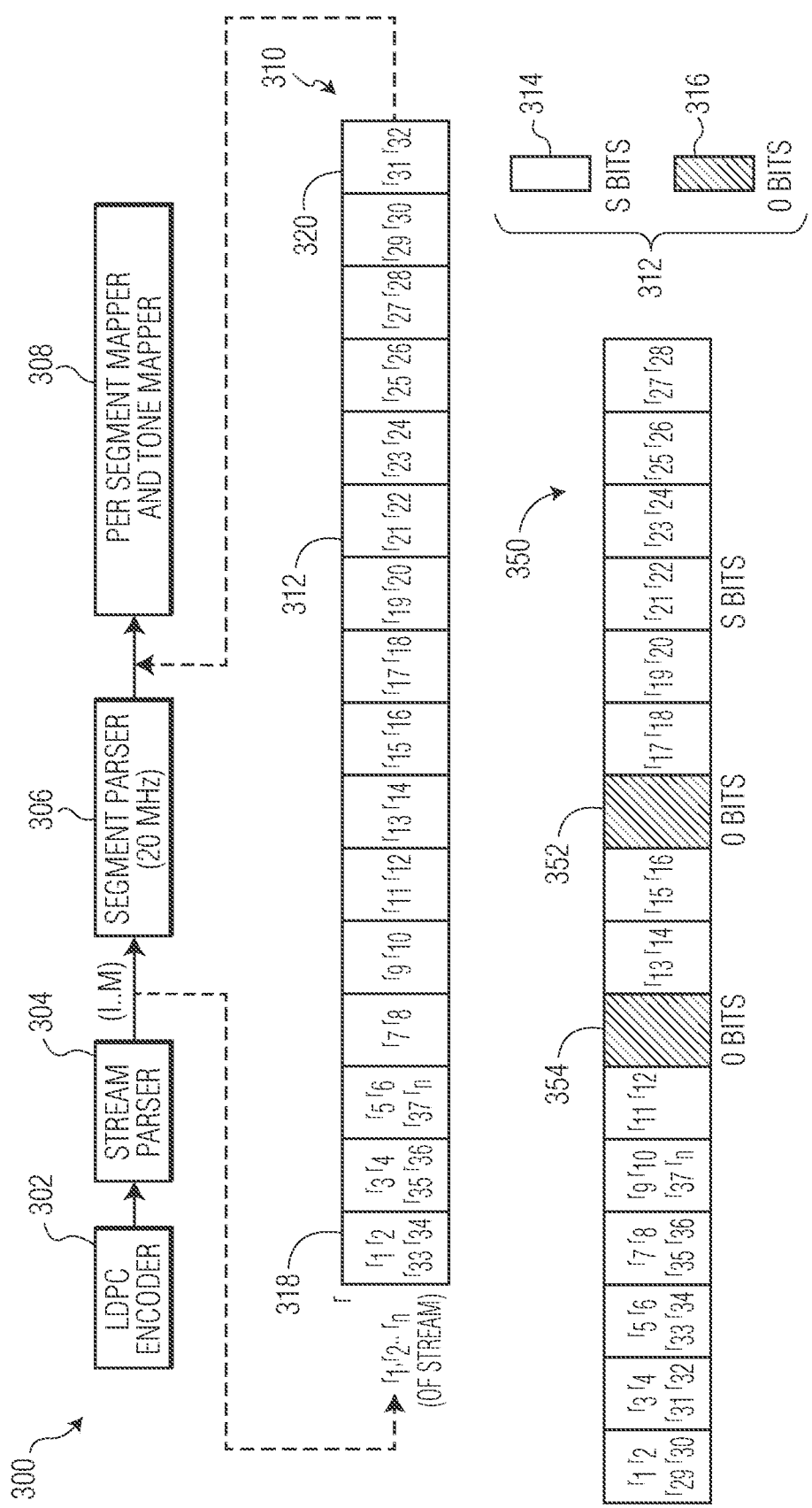
FIG. 3 illustrates another example fully joint data parser of the PHY processor which is arranged to perform the data parsing for transmitting data over a frequency range with one or more punctured subchannels, in accordance with exemplary embodiments of the invention.

FIG. 3 illustrates another data parser 140 of the PHY processor 130 shown as fully joint data parser 300 which is arranged to perform the data parsing for transmitting data units over a frequency range with one or more punctured frequency segments. The data parser 300 includes an encoder 302, a stream parser 304, a segment parser 306, and a constellation mapper and tone mapper 308. The encoder 302, stream parser 304, segment parser 306, and constellation mapper and tone mapper 308 may be each implemented in software, circuitry such as analog circuitry, mix·signal circuitry, memory circuitry, logic circuitry, processing circuitry, or combinations thereof.

The encoder 302 and stream parser 304 operate in a manner similar to that described above with respect to data parser 200 and descriptions of operation are not repeated for reasons of conciseness. The bits of a stream are represented by $r_1$ to $r_n$ where r represents a bit. The segment parser 306 may allocate bits from a stream output by the stream parser 304 to a frequency range 310 such as 160 MHz (as shown) or 320 MHz (not shown). Instead of the frequency range 310 having frequency segments with a bandwidth of 80 MHz, the frequency segment 312 may have a bandwidth of 20 MHz for example which is the same as the bandwidth of a subchannel. The segment parser 306 may allocate s bits from a stream output, such as s=2 in this example, by the stream parser 304 to each 20 MHz frequency segment between frequency segment 318 and frequency segment 320 (a round) and a process repeated back at segment 318 one or more times or rounds until a total number of bits of the stream are allocated based on the round robin process for s=2. The data parser 300 then comprises a per segment constellation mapper and tone mapper 308. The constellation mapper may map groups of bits of a frequency segment processed by the segment parser 306 to a constellation point in a constellation. The constellation which the group of bits is mapped may be, for example, a binary phase shift keying (BPSK) signal or a QAM constellation. The tone mapper then maps each of the signals output by the constellation mapper to one or more subcarriers (tone) defined for the frequency segment where each subcarrier may be orthogonal to each other.

In some examples, a frequency segment 312 may be punctured or not punctured. In examples, the frequency segment is punctured if the only subchannel of the frequency segment is punctured, and not punctured if the only subchannel of frequency segment is not punctured. In one example, if one 20 MHz segment is punctured, then a 140 MHz bandwidth of frequency segments of the frequency range 310 may be available to transmit. In another example, if two 20 MHz segment is punctured a 120 MHz bandwidth of frequency segments of the frequency range 310 may be available to transmit. In yet another example, if three 20 MHz segments is punctured a 100 MHz bandwidth of frequency segments of the frequency range 310 may be available to transmit.

Frequency segment 314 is an example of one of the frequency segment 312 which is not punctured, illustrated by a lack of shading. In examples, s bits is allocated to a frequency segment 314 which is not punctured during the round robin. Frequency segment 316 is an example of one frequency segment 312 but which is punctured, illustrated by the shading. In examples, no bits is allocated to a frequency segment 316 which is punctured during the round robin, instead of allocating s bits, as shown by frequency segment 314 in the frequency range 310. An example of a frequency range with one or more frequency segments which are punctured is shown as frequency range 350. Frequency segments 352, 354 are punctured in this example resulting in 120 MHz of bandwidth available for transmission in the frequency range 310. The frequency segments which are not punctured may be allocated s bits and the frequency segments which are not punctured may be allocated no bits. More or less frequency segments may be punctured in other examples.

Unlike defining frequency segments to transmit user data where a subchannel may be punctured and a non-zero number of bits are allocated to the frequency segment with the punctured subchannel, the frequency segment 312 reduces complexity of the segment parser 306 because bits are either allocated if the frequency segment 312 is not punctured or no bits are allocated if the frequency segment 312 is punctured, with a tradeoff of diversity, rather than allocating bits on a variable effective bandwidth. The allocation of bits to 20 MHz frequency segments reduces a signal to noise ratio of the bits compared to allocating bits in up to a 80 MHz frequency segment.

The encoder 302 encodes the bits with a code rate which depends on a sum of the effective bandwidth of the one or more frequency segments in the frequency spectrum. In examples, the encoder 302 may encode bits based on a sum of the effective bandwidth of the frequency range 310 such as 20 MHz, 40 MHz, 60 MHz, 80 MHz, 100 MHz, 120 MHz, 140 MHz, 160 MHz for a 160 MHz frequency range 142. The encoder 302 may also encode bits based on a number of data bits per OFDM symbol ($N_{DBPS}$) and a number of coded bits per OFDM symbol ($N_{CBPS}$) transmitted by the wireless device 114 which depend on a bandwidth of the frequency range which is not punctured and a modulation scheme associated with the symbol. The wireless device 114 may store one or more tables which indicate for a bandwidth and modulation scheme, the $N_{DBPS}$ and $N_{CBPS}$ $N_{DBPS}$ may be used to determine a number of OFDM symbols to transmit the PSDU based on a length the PSDU and the number of OFDM symbols may be used to determine a number of payload bits $N_{pld}$. Further, the $N_{CBPS}$ and the number of OFDM symbols may be used to determine a number of available bits Navbits to encode. The $N_{pld}$ and Navbits are both inputs to the LDPC encoder to define a LDPC codeword length and number of LDPC codewords to encode the bits of the data unit using conventional LDPC encoding techniques.

Figure 4:
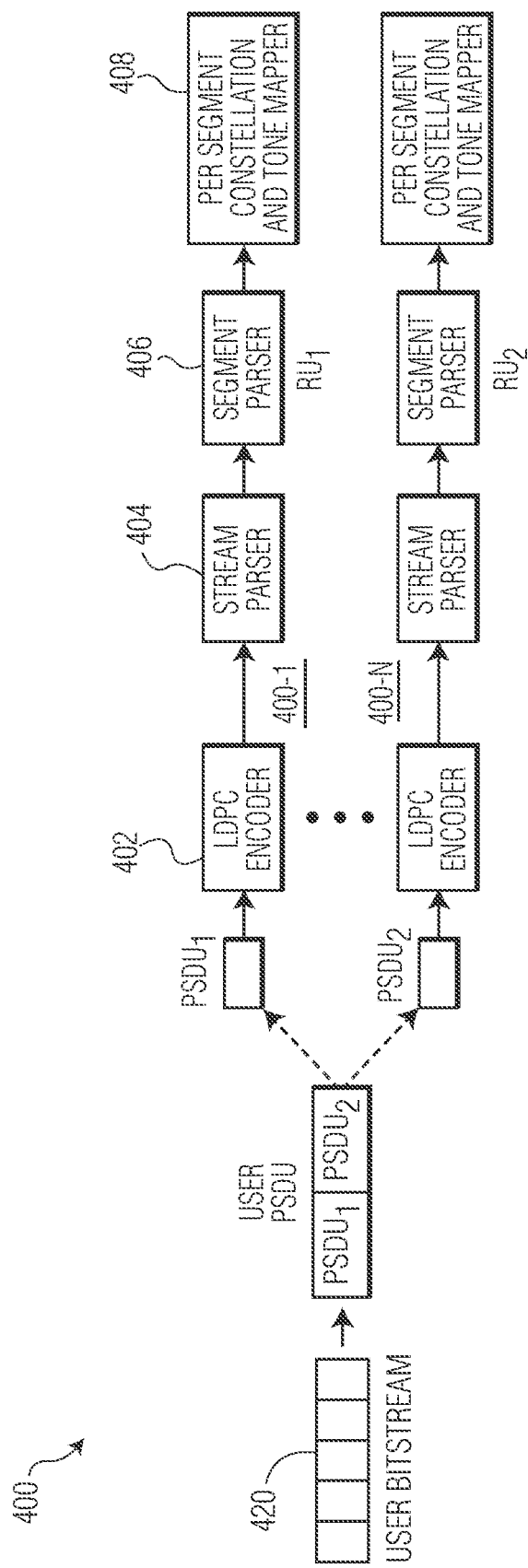
FIG. 4 illustrates an example resource unit (RU) based data parser of the PHY processor which is arranged to perform the data parsing for transmitting data over a frequency range with one or more punctured subchannels, in accordance with exemplary embodiments of the invention.

FIG. 4 illustrates an example data parser 140 of the PHY processor 130 shown as RU data parser 400 which is arranged to perform the data parsing for transmitting data units over a frequency range with one or more punctured frequency segments. The example data parser 400 is shown as a plurality of data parsers 400-1 to 400-N. Each data parser 400 includes an encoder 402, stream parser 404, segment parser 406, and constellation mapper and tone mapper 408. The encoder 402, stream parser 404, segment parser 406, and constellation mapper and tone mapper 408 is implemented in software, circuitry such as analog circuitry, mix-signal circuitry, memory circuitry, logic circuitry, processing circuitry, or combinations thereof.

In examples, the MAC processor 126 may generate one or more data units such as PSDUs based on bits 420 to be transmitted to a wireless device (also referred to also as a "user") and provide each PSDU to a respective data parser. The data unit such as a PSDU may be associated with a same user based on a same traffic identifier (TID) embedded in the PSDU. Examples of the PSDUs are shown as PSDU1 and PSDU2 but the MAC processor 126 may generate more or less PSDUs. Further, the user may be associated with a plurality of RUs shown as RU1 and RU2 in this example where each RU comprise a different set of subcarriers in the frequency range for transmitting bits, instead of a single RU being assigned to the user. Further, each RU has a contiguous bandwidth for transmitting bits which does not span across any punctured subchannels of a frequency range and may be comprise one or more frequency segments. For example, the RU may have a bandwidth of 20 MHz, 40 MHz, 60 MHz, 80, or 160 MHz depending on a configuration of the data parser 400. In examples, the MAC processor 126 may define a size of the PSDU (i.e., number of bits) based one or more of the effective bandwidths of the frequency segments, a number of spatial streams, and the MCS. Each of the plurality of data units are input into to a respective data parser, shown as 400-1 and 400-N, which transmits the data unit input over a respective RU of the user in one or more spatial streams. In examples N is greater than or equal to one and the data parser 400 may have more than two data parsers. The encoder 402 may encode the bits of the data unit which is input followed by the stream parser 404 parsing the encoded bits into streams. The segment parser 406 of the data parser 400 may allocate bits of a stream output by the stream parser 404 over the respective RU which do not have frequency segments with punctured subchannels. The constellation mapper of the constellation mapper and tone mapper 408 may then modulate groups of the bits associated with a frequency segment to, for example, a binary phase shift keying (BPSK) signal or a QAM signal of the mapped group of bits. The tone mapper of the constellation mapper and tone mapper 408 may then map each of the signals output by the constellation mapper to one or more subcarriers of the respective RU for transmission by the transceiver 134 over the one or more antennas 138 as one or more spatial streams. In examples, the MAC processor 126 may also align the PSDUs input into the data parsers in time so that the data units output by the data parsers are aligned in time. Additionally or alternatively, the PHY processor 130 may align the OFDM symbols output by each data parser in time by adding PHY padding to one or more of the ODFM symbols.

Figure 5:
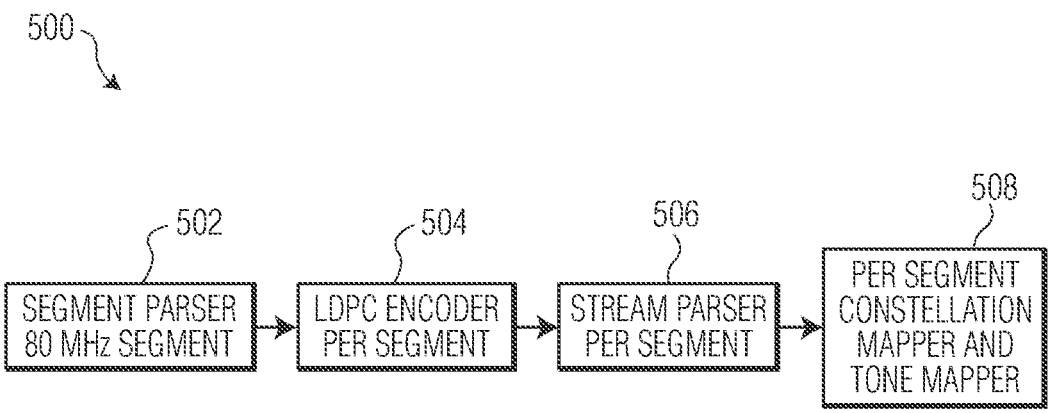
FIG. 5 illustrates an example semi-joint data parser of the PHY processor which is arranged to perform the data parsing for transmitting data over a frequency range with one or more punctured subchannels, in accordance with exemplary embodiments of the invention.

FIG. 5 illustrates an example data parser 140 of the PHY processor 130 shown as semi-joint data parser 500 which is arranged to perform the data parsing for transmitting data units over a frequency range with one or more punctured frequency segments. The data parser 500 includes a segment parser 502, an encoder 504, a stream parser 506, and a constellation mapper and tone mapper 508. Unlike the data parser 200, 300, 400 the segment parser 502 receives a data unit such as a PSDU from the MAC processor 126 rather than from an encoder. In examples, the MAC processor 126 may define a size of the PSDU (i.e., number of bits) based one or more of the effective bandwidths of the frequency segments, a number of spatial streams, and the MCS. The segment parser 502 may allocate bits of the data unit to one or more frequency segments based on an effective bandwidth of each of one or more frequency segments, in a manner similar to that described with respect to segment parser 206, 306. For example, in the event that the frequency range is 320 MHz and comprises four 80 MHz frequency segments, the segment parser 502 may allocate the bits of the data unit to the four 80 MHz frequency segments in accordance with an effective bandwidth of the 80 MHz frequency segments.

The encoder 504 may then separately encode the bits allocated to a frequency segment followed by the stream parser 506 parsing the encoded bits to one or more streams. The encoding may be over an effective bandwidth of a frequency segment to which the encoded bits of the data unit is allocated, which can be 20 MHz, 40 MHz, 60 MHz, or 80 MHz, which is referred to as semi-joint encoding. The encoding is not over the sum of the effective bandwidth of each frequency segment over the frequency range as described with the data parser 200, 300 described above. The stream parser 506 parses the encoded bits for a frequency segment to one or more spatial streams. The constellation mapper of the constellation mapper and tone mapper may then modulate groups of the bits associated with a frequency segment having one or more streams to, for example, a binary phase shift keying (BPSK) signal or a QAM signal representation of the mapped group of bits. The tone mapper then maps each of the signals output by the constellation mapper to one or more subcarriers of the frequency segment for transmission by the transceiver 134 over the one or more antennas 138 as one or more spatial streams. The LDPC encoder, stream parser, and per segment constellation mapping and tone mapper may be performed for each frequency segment to output a PPDU over one or more antennas as one or more spatial streams.

The encoder 502 may encode bits associated with frequency segments separately. The encoding of the bits associated with a frequency segment reduces a diversity compared to the encoding bits over a plurality of frequency segments because the encoding of the bits associated with a frequency segment has a lower signal to noise ratio compared to encoding over a plurality of frequency segments. Further, the tone mapper of the constellation and tone mapper 508 may perform the mapping based on an effective bandwidth of the frequency segment, which is 20 MHz, 40 MHz, 60 MHz, or 80 MHz for an 80 MHz segment.

Figure 6:
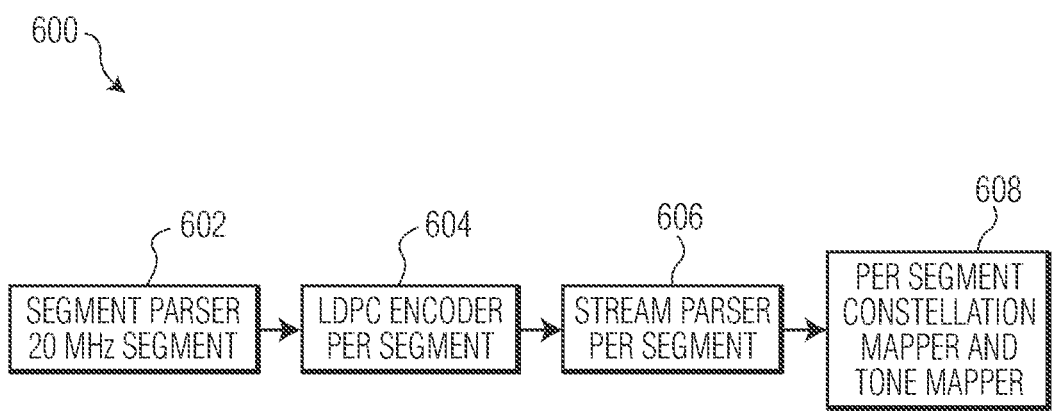
FIG. 6 illustrates another example semi-joint data parser of the PHY processor which is arranged to perform the data parsing for transmitting data over a frequency range with one or more punctured subchannels in accordance with exemplary embodiments of the invention

FIG. 6 illustrates yet another example data parser 600 of the PHY processor 130 which is arranged to perform the data parsing for transmitting data units over a frequency range which is punctured. The data parser 600 includes a segment parser 602, an encoder 604, a stream parser 606, and a constellation mapper and tone mapper 608. Unlike the data parser 200, 300, 400, the segment parser 602 receives a data unit from the MAC processor 126. In examples, the segment parser 602 allocates bits to a frequency segment if the frequency segment is not punctured and does not allocate bits to a frequency segment if the frequency segment is punctured. In examples, the frequency segment is punctured if the only subchannel of the frequency segment is punctured, and not punctured if the only subchannel of frequency segment is not punctured. To illustrate, in the event that the frequency range is 320 MHz and comprises sixteen 20 MHz frequency segments, the segment parser 602 may allocate the bits to up to the sixteen of the 20 MHz frequency segments depending on whether the frequency segment is punctured. If the 20 MHz frequency segment is punctured, no bits are allocated and if the 20 MHz frequency segment is not punctured, s bits may be allocated. An encoding may be based on a bandwidth of a frequency segment to which the bits of the data unit is allocated, which is 20 MHz. It is not 40 MHz, 60 MHz or 80 MHz. 120 MHz, 140 MHz, or 160 MHz as described with the data parser 200, 300 described above when the frequency range is 160 MHz, for example. The encoding may be further based on a number of data bits per orthogonal frequency division multiplexing (OFDM) symbol ($N_{DBPS}$) and a number of coded bits per OFDM symbol ($N_{CBPS}$) transmitted by the wireless device 114 which depend on a bandwidth of the frequency range 142 which is not punctured such as a 20 MHz segment and a modulation scheme associated with the symbol. The stream parser 606 parses the encoded stream for a frequency segment to one or more spatial streams. The constellation mapper of the constellation mapper and tone mapper 608 may then modulate groups of the bits associated with a frequency segment having one or more streams to, for example, a binary phase shift keying (BPSK) signal or a QAM signal representation of the mapped group of bits on a per segment basis. The tone mapper then maps each of the signals output by the constellation mapper to one or more subcarriers of the frequency segment for transmission by the transceiver 134 over the one or more antennas 138 as one or more spatial streams.

Example Functions

Figure 7:
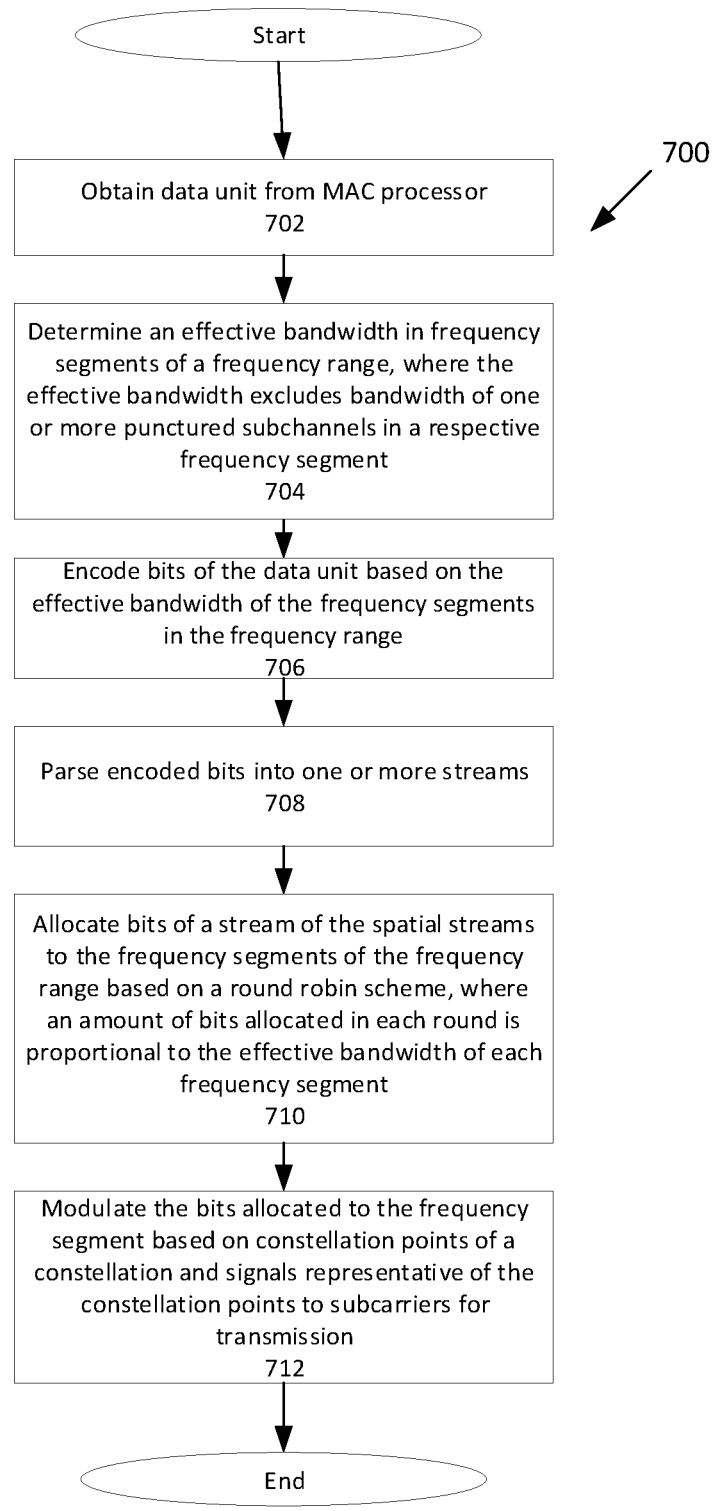
FIG. 7 is an example flow chart of functions associated with the data parser of FIG. 2 or FIG. 3 in accordance with exemplary embodiments of the invention.

FIG. 7 is an example flow chart of functions 700 performed by the data parser 200, 300 for multiple input multiple output (MIMO) punctured transmission. The functions 700 may be performed with software, analog circuitry, mix·signal circuitry, memory circuitry, logic circuitry, or combinations thereof.

At step 702, a data unit is obtained from a MAC processor. The data unit may be a PSDU associated with a user and comprise a plurality of bits that a PHY processor 130 transmits as a PPDU. At step 704, an effective bandwidth in frequency segments of a frequency range is determined, where the effective bandwidth excludes bandwidth of one or more punctured subchannels in a respective frequency segment. The PHY processor 130 may determine this effective bandwidth. At step 706, bits of the data unit are encoded based on the effective bandwidth of the frequency segments in the frequency range. The encoding may be LDPC encoding among other encoding schemes, performed by the LDPC encoder, and the frequency range may span up to 160 MHz or up to 320 MHz in 802.11be. At step 708, the encoded bits are parsed into one or more streams. The stream parser may parse the encoded bits. At 710, bits of a stream of the spatial streams are allocated to the frequency segments of the frequency range based on a round robin scheme, where the amount of bits allocated in each round is proportional to the effective bandwidth of each frequency segment. At 712, the bits allocated to the segment are modulated based on constellation points of a constellation and signals representative of the constellation points are mapped to subcarriers for transmission. The constellation mapper and tone mapper may perform the modulation and mapping. The segment parsing and per segment constellation mapping and tone mapper may be performed for each stream output by the stream parser 206 to transmit a data unit such as a PPDU.

Figure 8:
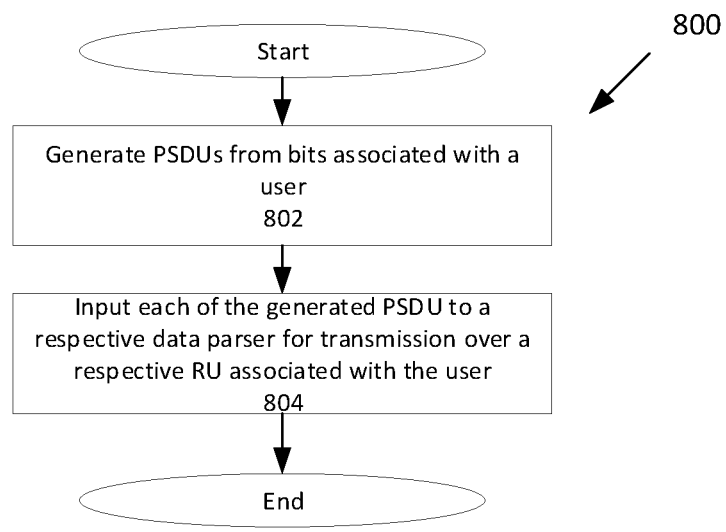
FIG. 8 is an example flow chart of functions associated with the data parser of FIG. 4 in accordance with exemplary embodiments of the invention.

FIG. 8 is an example flow chart of functions 800 performed by the data parser 400 for multiple input multiple output (MIMO) punctured transmission. The functions 800 may be performed with software, analog circuitry, mix·signal circuitry, memory circuitry, logic circuitry, or combinations thereof.

At step 802, a MAC processor generates a plural of PSDUs from bits associated with a user. Each PSDU may be transmitted over a respective RU, where a plurality of RUs are assigned to the user. Each RU has a contiguous frequency range over which the respective PSDU is transmitted. In examples, the MAC processor 126 may define a size of the PSDU (i.e., number of bits) based on one or more of a bandwidth of the RU over which the PSDU is transmitted, a number of spatial streams, and MCS. At step 804, each of the generated PSDUs are input to a respective data parser for transmission over a respective RU associated with the user. The data parser allocates bits of the PSDU to the RU which do not include any frequency segments with punctured subchannels for transmission over one or more spatial streams. Further, more than one RU may be associated with the user such that the PSDUs associated with the user are transmitted over different RUs to the user by different data parsers.

Figure 9:
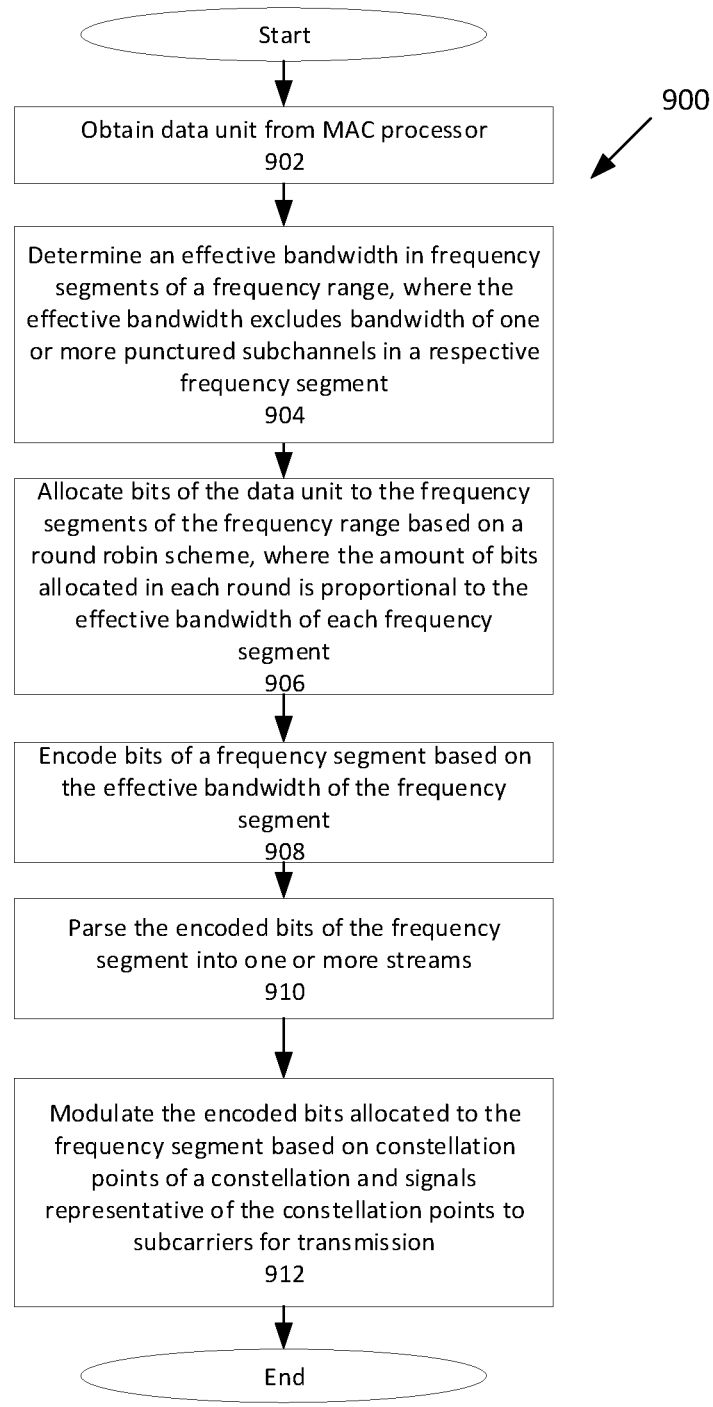
FIG. 9 is an example flow chart of functions associated with the data parser of FIG. 5 or FIG. 6 in accordance with exemplary embodiments of the invention.

FIG. 9 is an example flow chart of functions 900 performed by the data parser 500, 600 for multiple input multiple output (MIMO) punctured transmission. The functions 900 may be performed with software, analog circuitry, mix·signal circuitry, memory circuitry, logic circuitry, or combinations thereof.

At step 902, a data unit is obtained from a MAC processor. The data unit may be a PSDU associated with a user and comprise a plurality of bits that a PHY processor 130 transmits as a PPDU. At step 904, an effective bandwidth in frequency segments of a frequency range is determined, where the effective bandwidth excludes bandwidth of one or more punctured subchannels in a respective frequency segment. The PHY processor 130 may determine this effective bandwidth. At 906, bits of the data unit are allocated to the frequency segments of the frequency range based on a round robin scheme, where the amount of bits allocated in each round is proportional to the effective bandwidth of each frequency segment. At step 908, bits of a frequency segment are encoded based on the effective bandwidth of the frequency segment. The encoding may be LDPC encoding among other encoding schemes and performed by the LDPC encoder. At step 910, the encoded bits of the frequency segment are parsed into one or more streams. The stream parser may parse the encoded bits. At 912, the encoded bits allocated to the segment are modulated based on constellation points of a constellation and signals representative of the constellation points are mapped to subcarriers for transmission. The constellation mapper and tone mapper may perform the modulation and assignment. The LDPC encoder, stream parser, and per segment constellation mapping and tone mapper may be performed for each frequency segment to output a PPDU over one or more antennas as one or more spatial streams.

Example Apparatus

Figure 10:
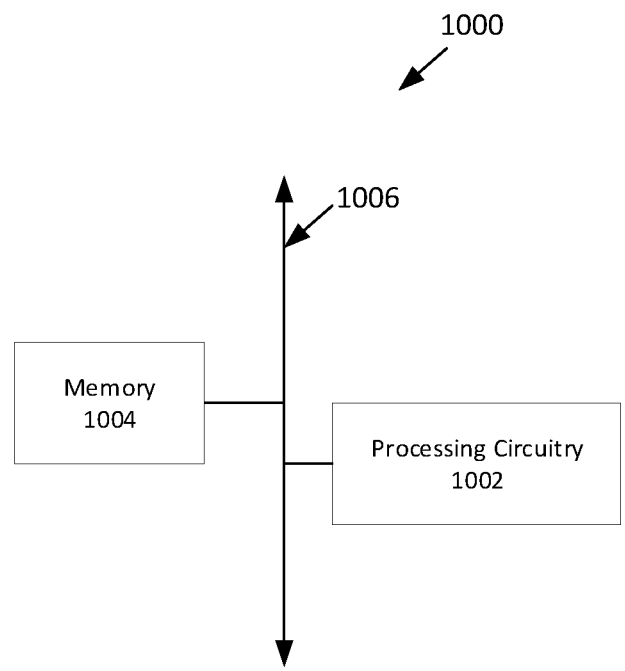
FIG. 10 is an example system diagram of one of the example data parsers in accordance with exemplary embodiments of the invention.

FIG. 10 is an example system diagram of a data parser for multiple input multiple output (MIMO) punctured transmission. The system diagram shows a device 1000 which may be the data parser having a processing circuitry 1002 and a memory 1004. The processing circuitry 1002 (possibly including multiple processors, multiple cores, multiple nodes, and/or implementing multi-threading, etc.) may perform the various functions of the data parser described above such the LDPC encoder, the stream parser, the segment parser, and the constellation mapper and tone mapper in software, circuitry such as analog circuitry, mix·signal circuitry, memory circuitry, logic circuitry, processing circuitry, or combinations thereof. The memory 1004 such as one or more of cache, SRAM, DRAM, zero capacitor RAM, Twin Transistor RAM, eDRAM, EDO RAM, DDR RAM, EEPROM, NRAM, RRAM, SONOS, PRAM, etc. may store the data unit from the MAC processor 126, intermediate data associated with the data parsing of the data unit by the data parser, and the data unit to transmit. The memory 1004 may store also computer code, program instructions, computer instructions, program code for performing one or more operations or control of operations associated with the data parser. The processing circuitry 1002 and the memory 1004 may be coupled to an interconnect 1006 such as a bus (e.g., PCI, ISA, PCI-Express).

In one embodiment, a method is disclosed. The method comprises: obtaining from a media access control (MAC) processing circuitry a data unit comprising bits to transmit over one or more frequency segments in a frequency range; determining an effective bandwidth in each frequency segment of the frequency range, wherein the effective bandwidth excludes bandwidth of one or more punctured subchannels in a respective frequency segment; encoding the bits based on the effective bandwidth of each frequency segment; parsing the encoded bits to one or more streams; parsing the encoded bits of a stream to the one or more frequency segments, wherein the parsing of the encoded bits of the stream comprises allocating a first number of consecutive encoded bits to a first frequency segment and allocating a second number of consecutive encoded bits to a second frequency segment, wherein the first number is based on the effective bandwidth of the first frequency segment and the second number is based on the effective bandwidth of the second frequency segment; modulating the encoded bits allocated to each frequency segment based on constellation points of a constellation; and mapping signals representative of the constellation points to subcarriers of the respective frequency segment for transmission over the frequency range. In an embodiment, allocating the first number of consecutive encoded bits comprises allocating the first number proportional to the effective bandwidth of the first frequency segment and allocating the second number of consecutive encoded bits comprises allocating the second number proportional to the effective bandwidth of the second frequency segment. In an embodiment, allocating the first number of consecutive encoded bits comprising allocating the first number which is a multiple of s bits, where the multiple is based on a number of subchannels of the first frequency segment which is not punctured. In an embodiment, s is based on a number of bits of one of the constellation points in the constellation. In an embodiment, the first frequency segment and the second frequency segment each comprise only one subchannel; wherein no bits are allocated to the first frequency segment in response to the one subchannel of the first frequency segment being punctured and s bits are allocated to the first frequency segment in response to the one subchannel of the first frequency segment not being punctured. In an embodiment, the puncturing of the subchannel comprises puncturing of one or more of the subcarriers of the subchannel. In an embodiment, the data unit is a protocol service data unit (PSDU) received from the media access layer. In an embodiment, allocating the first number of consecutive encoded bits and allocating the second number of consecutive encoded bits comprises allocating the first number and allocating the second number in one or more rounds over the frequency segments of the frequency range based on a round robin process. In an embodiment, the first frequency segment has one or more punctured subchannels and the second frequency segment does not have a punctured subchannel, the method further comprises parsing unallocated bits of the encoded bits to the second frequency segment and a third frequency segment of the frequency range without punctured subchannels and not to the first frequency segment. In an embodiment, parsing unallocated bits comprises parsing to the second frequency segment and third frequency segment based on a round robin process.

In another embodiment, a wireless device is disclosed. The wireless device comprises: a media access control (MAC) processing circuitry; a physical layer processing circuitry which includes a data parser and a transceiver; the data parser configured to: obtain, from the MAC processing circuitry, a data unit comprising bits to transmit over one or more frequency segments in a frequency range; determine an effective bandwidth in each frequency segment of the frequency range, wherein the effective bandwidth excludes bandwidth of one or more punctured subchannels in a respective frequency segment; encode the bits based on the effective bandwidth of each frequency segment; parse the encoded bits to one or more streams; parse the encoded bits of a stream to the one or more frequency segments, wherein the parsing of the encoded bits of the stream comprises allocating a first number of consecutive encoded bits to a first frequency segment and allocating a second number of consecutive encoded bits to a second frequency segment, wherein the first number is based on the effective bandwidth of the first frequency segment and second number is based on the second frequency segment; the transceiver configured to modulate the encoded bits allocated to each frequency segment based on constellation points of a constellation; and map signals representative of the constellation points to subcarriers of the respective frequency segment for transmission over the frequency range. In an embodiment, the data parser configured to allocate the first number comprises the data parser configured to allocate the first number proportional to the effective bandwidth of the first frequency segment and the data parser configured to allocate the second number comprises the data parser configured to allocate the second number proportional to the effective bandwidth of the second frequency segment. In an embodiment, allocating the first number of consecutive encoded bits comprising allocating a number of bits to the first frequency segment which is a multiple of s, where the multiple of s is based on a number of subchannels of the first frequency segment which is not punctured. In an embodiment, s is based on a number of bits of one of the constellation points in the constellation. In an embodiment, the first frequency segment and the second frequency segment each comprise only one subchannel; wherein no bits are allocated to the first frequency segment in response to the one subchannel of the first frequency segment being punctured and s bits are allocated to the first frequency segment in response to the one subchannel of the first frequency segment not being punctured. In an embodiment, the puncturing of the subchannel comprises puncturing of one or more of the subcarriers of the subchannel. In an embodiment, the data unit is a protocol service data unit (PSDU) received from MAC processor. In an embodiment, the data parser configured to allocate the first number of consecutive encoded bits and allocate the second number of consecutive encoded bits in one or more rounds over the frequency segments of the frequency range based on a round robin process. In an embodiment, the first frequency segment has one or more punctured subchannels and the second frequency segment does not have a punctured subchannel, the data parser configured to parse unallocated bits of the encoded bits to the second frequency segment and a third frequency segment of the frequency range without punctured subchannels and not to the first frequency segment.

In yet another embodiment, a method is disclosed. The method comprises: obtaining from a media access control (MAC) processing circuitry a data unit comprising bits to transmit over one or more frequency segments in a frequency range; determining an effective bandwidth in each frequency segment of the frequency range, wherein the effective bandwidth excludes bandwidth of one or more punctured subchannels in a respective frequency segment; encoding the bits based on the effective bandwidth of each frequency segment; parsing the encoded bits to one or more streams; parsing the encoded bits of a stream to the one or more frequency segments, wherein the parsing of the encoded bits of the stream comprises allocating a first number of consecutive encoded bits to a first frequency segment and allocating a second number of consecutive encoded bits to a second frequency segment, wherein the first number is allocated proportional to the effective bandwidth of the first frequency segment and the second number is allocated proportional to the effective bandwidth of the second frequency segment in one or more rounds over the frequency segments of the frequency range based on a round robin process; modulating the encoded bits allocated to each frequency segment based on constellation points of a constellation; and mapping signals representative of the constellation points to subcarriers of the respective frequency segment for transmission over the frequency range.

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof: including potentially a program operable to cause one or more data processing apparatus such as a processor to perform the operations described (such as program code encoded in a non-transitory computer-readable medium, which can be a memory device, a storage device, a machine-readable storage substrate, or other physical, machine readable medium, or a combination of one or more of them).

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The foregoing description refers to or shows elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with, electrically or otherwise) another element, and not necessarily mechanically.

Other implementations fall within the scope of the following claims.

What is claimed is:

1. A method comprising:
obtaining from a media access control (MAC) processing circuitry a data unit comprising bits to transmit over one or more frequency segments in a frequency range;
determining an effective bandwidth in each frequency segment of the frequency range, wherein the effective bandwidth excludes bandwidth of one or more punctured subchannels in a respective frequency segment;
encoding the bits based on the effective bandwidth of each frequency segment;
parsing the encoded bits to one or more streams;
parsing the encoded bits of a stream to the one or more frequency segments, wherein the parsing of the encoded bits of the stream comprises allocating a first number of consecutive encoded bits to a first frequency segment and allocating a second number of consecutive encoded bits to a second frequency segment, wherein the first number is a number of bits of a constellation point in a constellation multiplied by a ratio of a count of subchannels which are not punctured in the first frequency segment divided by a maximum common divisor of a set of numbers, each number of the set corresponding to a count of subchannels which are not punctured in a respective frequency segment of the one or more frequency segments and the second number is the number of bits of the constellation point in the constellation multiplied by a ratio of a count of subchannels which are not punctured in the second frequency segment divided by the maximum common divisor;
modulating the encoded bits allocated to each frequency segment based on the constellation points of the constellation; and
mapping signals representative of the constellation points to subcarriers of the respective frequency segment for transmission over the frequency range.

2. The method of claim 1, wherein allocating the first number of consecutive encoded bits comprises allocating the first number proportional to the effective bandwidth of the first frequency segment and allocating the second number of consecutive encoded bits comprises allocating the second number proportional to the effective bandwidth of the second frequency segment.

3. The method of claim 1, wherein allocating the first number of consecutive encoded bits comprising allocating the first number which is a multiple of s bits, where the multiple is based on a number of subchannels of the first frequency segment which is not punctured.

4. The method of claim 3, wherein the s bits is based on the number of bits of one of the constellation points in the constellation.

5. The method of claim 1, wherein the first frequency segment and the second frequency segment each comprise only one subchannel; wherein no bits are allocated to the first frequency segment in response to the one subchannel of the first frequency segment being punctured and s bits are allocated to the first frequency segment in response to the one subchannel of the first frequency segment not being punctured.

6. The method of claim 1, wherein the puncturing of the subchannel comprises puncturing of one or more of the subcarriers of the subchannel.

7. The method of claim 1, wherein the data unit is a protocol service data unit (PSDU) received from the media access layer.

8. The method of claim 1, wherein allocating the first number of consecutive encoded bits and allocating the second number of consecutive encoded bits comprises allocating the first number and allocating the second number in one or more rounds over the frequency segments of the frequency range based on a round robin process.

9. The method of claim 1, wherein the first frequency segment has one or more punctured subchannels and the second frequency segment does not have a punctured subchannel, the method further comprises parsing unallocated bits of the encoded bits to the second frequency segment and a third frequency segment of the frequency range without punctured subchannels and not to the first frequency segment.

10. The method of claim 9, wherein parsing unallocated bits comprises parsing to the second frequency segment and third frequency segment based on a round robin process.

11. A wireless device comprising:
a media access control (MAC) processing circuitry;
a physical layer processing circuitry which includes a data parser and a transceiver;
the data parser configured to:
obtain, from the MAC processing circuitry, a data unit comprising bits to transmit over one or more frequency segments in a frequency range;
determine an effective bandwidth in each frequency segment of the frequency range, wherein the effective bandwidth excludes bandwidth of one or more punctured subchannels in a respective frequency segment;
encode the bits based on the effective bandwidth of each frequency segment;
parse the encoded bits to one or more streams;
parse the encoded bits of a stream to the one or more frequency segments, wherein the parsing of the encoded bits of the stream comprises allocating a first number of consecutive encoded bits to a first frequency segment and allocating a second number of consecutive encoded bits to a second frequency segment, wherein the first number is a number of bits of a constellation point in a constellation multiplied by a ratio of a count of subchannels which are not punctured in the first frequency segment divided by a maximum common divisor of a set of numbers, each number of the set corresponding to a count of subchannels which are not punctured in a respective frequency segment of the one or more frequency segments and second number is the number of bits of the constellation point in the constellation multiplied by a ratio of a count of subchannels which are not punctured in the second frequency segment divided by the maximum common divisor;
the transceiver configured to modulate the encoded bits allocated to each frequency segment based on constellation points of a constellation; and map signals representative of the constellation points to subcarriers of the respective frequency segment for transmission over the frequency range.

12. The wireless device of claim 11, wherein the data parser configured to allocate the first number comprises the data parser configured to allocate the first number proportional to the effective bandwidth of the first frequency segment and the data parser configured to allocate the second number comprises the data parser configured to allocate the second number proportional to the effective bandwidth of the second frequency segment.

13. The wireless device of claim 11, wherein allocating the first number of consecutive encoded bits comprising allocating a number of bits to the first frequency segment which is a multiple of s bits, where the multiple of s bits is based on a number of subchannels of the first frequency segment which is not punctured.

14. The wireless device of claim 13, wherein the s bits is based on a number of bits of one of the constellation points in the constellation.

15. The wireless device of claim 11, wherein the first frequency segment and the second frequency segment each comprise only one subchannel; wherein no bits are allocated to the first frequency segment in response to the one subchannel of the first frequency segment being punctured and s bits are allocated to the first frequency segment in response to the one subchannel of the first frequency segment not being punctured.

16. The wireless device of claim 11, wherein the puncturing of the subchannel comprises puncturing of one or more of the subcarriers of the subchannel.

17. The wireless device of claim 11, wherein the data unit is a protocol service data unit (PSDU) received from MAC processor.

18. The wireless device of claim 11, wherein the data parser configured to allocate the first number of consecutive encoded bits and allocate the second number of consecutive encoded bits in one or more rounds over the frequency segments of the frequency range based on a round robin process.

19. The wireless device of claim 11, wherein the first frequency segment has one or more punctured subchannels and the second frequency segment does not have a punctured subchannel, the data parser configured to parse unallocated bits of the encoded bits to the second frequency segment and a third frequency segment of the frequency range without punctured subchannels and not to the first frequency segment.

20. A method comprising:
obtaining from a media access control (MAC) processing circuitry a data unit comprising bits to transmit over one or more frequency segments in a frequency range;
determining an effective bandwidth in each frequency segment of the frequency range, wherein the effective bandwidth excludes bandwidth of one or more punctured subchannels in a respective frequency segment;
encoding the bits based on the effective bandwidth of each frequency segment;
parsing the encoded bits to one or more streams;
parsing the encoded bits of a stream to the one or more frequency segments, wherein the parsing of the encoded bits of the stream comprises allocating a first number of consecutive encoded bits to a first frequency segment and allocating a second number of consecutive encoded bits to a second frequency segment, wherein the first number is a number of bits of a constellation point in a constellation multiplied by a ratio of a count of subchannels which are not punctured in the first frequency segment divided by a maximum common divisor of a set of numbers, each number of the set corresponding to a count of subchannels which are not punctured in a respective frequency segment of the one or more frequency segments and the second number is the number of bits of the constellation point in the constellation multiplied by a ratio of a count of subchannels which are not punctured in the second frequency segment divided by the maximum common divisor in one or more rounds over the frequency segments of the frequency range based on a round robin process;
modulating the encoded bits allocated to each frequency segment based on constellation points of a constellation; and
mapping signals representative of the constellation points to subcarriers of the respective frequency segment for transmission over the frequency range.

* * * * *